United States Patent
Konno et al.

(10) Patent No.: US 11,378,146 B2
(45) Date of Patent: Jul. 5, 2022

(54) DISC BRAKE

(71) Applicant: HITACHI AUTOMOTIVE SYSTEMS, LTD., Ibaraki (JP)

(72) Inventors: Takuya Konno, Chuo (JP); Shigeru Hayashi, Minami-Alps (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 72 days.

(21) Appl. No.: 16/628,807

(22) PCT Filed: May 17, 2018

(86) PCT No.: PCT/JP2018/019064
§ 371 (c)(1),
(2) Date: Jan. 6, 2020

(87) PCT Pub. No.: WO2019/012805
PCT Pub. Date: Jan. 17, 2019

(65) Prior Publication Data
US 2020/0132144 A1 Apr. 30, 2020

(30) Foreign Application Priority Data

Jul. 11, 2017 (JP) .............................. JP2017-135561

(51) Int. Cl.
*F16D 65/097* (2006.01)
*F16D 55/00* (2006.01)

(52) U.S. Cl.
CPC .... *F16D 65/097* (2013.01); *F16D 2055/0008* (2013.01); *F16D 2055/0016* (2013.01); *F16D 2055/0041* (2013.01)

(58) Field of Classification Search
CPC ............. F16D 65/0972; F16D 65/0978; F16D 65/0979; F16D 2055/0041;
(Continued)

(56) References Cited

U.S. PATENT DOCUMENTS 7,219,773 B2 * 5/2007 Ono ..................... F16D 65/0971
188/250 E
7,766,131 B2 * 8/2010 Hayashi .............. F16D 65/0972
188/73.37
(Continued)

FOREIGN PATENT DOCUMENTS

JP 2006-308011 11/2006
JP 2007271064 A * 10/2007
(Continued)

OTHER PUBLICATIONS

English translation of JP 2012247054A (Year: 2007).*
(Continued)

*Primary Examiner* — Robert A. Siconolfi
*Assistant Examiner* — Mahbubur Rashid
(74) *Attorney, Agent, or Firm* — Wenderoth, Lind & Ponack, L.L.P.

(57) ABSTRACT

A radially biasing portion (19) of a pad spring (14) includes a first extending portion (19A) extending from a lower surface plate (18B) of a guide plate portion (18) outwardly in a disc axial direction, a curled portion (19B) folded on a distal end side of the first extending portion, and a second extending portion (19C) extending from the curled portion in a direction approaching a disc (1), the second extending portion with which an ear portion (11A) of a friction pad (10) comes into contact. A contact portion (20) extends from the second extending portion of the radially biasing portion (19) toward a middle of the friction pad in a disc rotational direction of the friction pad. The contact portion comes into surface contact with a contacted surface (11B) as a lateral surface of the friction pad (backing plate 11) in the disc rotational direction.

11 Claims, 5 Drawing Sheets

(58) Field of Classification Search
CPC ............. F16D 2065/1396; F16D 55/22; F16D 65/097; F16D 2055/0008; F16D 55/02; F16D 2055/0016

See application file for complete search history.

(56) References Cited

U.S. PATENT DOCUMENTS

| | | | |
|---|---|---|---|
| 8,684,148 B2* | 4/2014 | Wakabayashi | F16D 65/0972 188/73.36 |
| 9,388,869 B2 | 7/2016 | Zhang et al. | |
| 2004/0144602 A1* | 7/2004 | Ono | F16D 65/0972 188/71.7 |
| 2006/0260884 A1 | 11/2006 | Hayashi | |
| 2007/0251772 A1* | 11/2007 | Tsurumi | F16D 65/095 188/73.38 |
| 2010/0243389 A1* | 9/2010 | Miura | F16D 65/0972 188/206 R |
| 2010/0326777 A1 | 12/2010 | Noguchi et al. | |
| 2015/0021127 A1* | 1/2015 | Miura | F16D 65/0977 188/73.38 |
| 2016/0084329 A1* | 3/2016 | Takeo | F16D 55/2265 188/73.38 |
| 2016/0131210 A1* | 5/2016 | Brizendine | F16D 55/226 188/73.38 |

FOREIGN PATENT DOCUMENTS

| | | |
|---|---|---|
| JP | 2012247054 A * | 12/2012 |
| JP | 5277089 | 8/2013 |
| JP | 5759793 | 8/2015 |

OTHER PUBLICATIONS

International Search Report dated Jul. 31, 2018 in International (PCT) Application No. PCT/JP2018/019064.

International Preliminary Report on Patentability dated Jul. 31, 2018 in International (PCT) Application No. PCT/JP2018/019064.

Office Action dated Sep. 23, 2020 in corresponding Indian Application No. 201917054513, with English translation.

* cited by examiner

DISC BRAKE

TECHNICAL FIELD

The invention relates to a disc brake that applies a braking force to a vehicle, such as a four-wheel automobile.

BACKGROUND ART

A disc brake disposed in a vehicle, such as a four-wheel automobile, is generally configured to press a pair of friction pads onto both sides of a disc with a caliper to apply a braking force to the vehicle with the friction pads mounted on a mounting member through pad springs. In such a case, the pad springs are provided with radially biasing portions that elastically bias ear portions of the friction pads outwardly in a disc radial direction, and rotation direction biasing portions that bias the friction pads in a disc rotational direction (circumferential direction) (Patent Literature 1, for example).

CITATION LIST

Patent Literature

PTL 1: Japanese Unexamined Patent Application Publication (Kokai) No. 2006-308011

SUMMARY OF INVENTION

Technical Problem

The pad springs of the conventional art each include the radially biasing portion and the rotational direction biasing portion which are separately arranged in different positions. The separate arrangement of the radially biasing portion and the rotational direction biasing portion increases the material cost for the pad springs and makes it difficult to improve productivity.

An object of the invention is to provide a disc brake that reduces a material cost for pad springs and also improves productivity.

Solution to Problem

One embodiment of the invention is applied to a disc brake comprising a mounting member including a pair of arm portions spaced away from each other in a rotational direction of a disc and straddling an outer peripheral side of the disc, the arm portions being provided with respective pad guides; a caliper disposed in each of the arm portions of the mounting member to be movable in a disc axial direction; a pair of friction pads including ear portions inserted in the respective pad guides of the mounting member, the pair of friction pads being pressed by the caliper against respective surfaces of the disc; and a pair of pad springs mounted on the respective arm portions of the mounting member and configured to elastically support the pair of friction pads between the arm portions.

The one embodiment of the invention is so configured that at least one of the pair of pad springs includes a guide plate portion comprising, for the purpose of guiding the ear portion in the disc axial direction, a first plate portion extending in the disc axial direction along an outer surface of the ear portion of the friction pad in a disc radial direction, a second plate portion extending in the disc axial direction along an inner surface of the ear portion in the disc radial direction, and a bottom plate portion extending in the disc axial direction along an outer surface of the ear portion in the disc rotational direction; a radially biasing portion comprising a proximal end portion including a proximal end side extending from the second plate portion of the guide plate portion outwardly in the disc axial direction, a folded portion formed by being folded from the proximal end portion inwardly in the disc axial direction into a shape of a letter U, and a distal end portion extending from the folded portion in the disc axial direction between the second plate portion and the ear portion of the friction pad, the radially biasing portion being configured to elastically bias the friction pad through the distal end portion outwardly in the disc radial direction; and a contact portion extending from the distal end portion of the radially biasing portion toward a middle of the friction pad in the disc rotational direction of the friction pad and configured to contact a lateral surface of the friction pad in the disc rotational direction.

According to the one embodiment of the invention, the contact portion disposed in the distal end portion of the radially biasing portion is capable of biasing the friction pad toward a middle position between a rotational inlet side and a rotational outlet side of the pad guide. The contact portion formed in the distal end portion of the radially biasing portion of the pad spring can be therefore used as a rotational direction biasing portion. This reduces the material cost for the pad springs and improves productivity.

DESCRIPTION OF EMBODIMENT

A disc brake according to an embodiment of the invention is discussed in detail with reference to the attached drawings.

Figure 1:
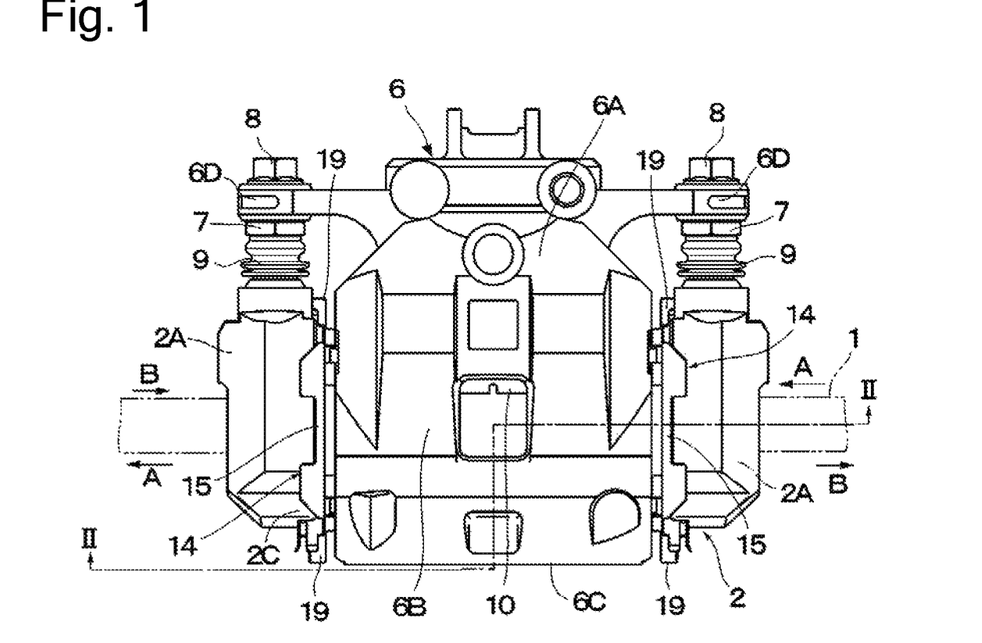
FIG. 1 is a plan view of a disc brake according to an embodiment of the invention as viewed from above.

FIGS. 1 to 9 illustrate the embodiment of the invention. In FIG. 1, a circular plate-like disc 1 shown by a chain double-dashed line rotates with a wheel, not shown, in a direction of an arrow A in FIG. 1, for example, when a vehicle travels forward, and rotates in an opposite direction to the direction of the arrow A when the vehicle travels backward. The following description refers to axial, radial, and rotational directions of the disc 1 as a "disc axial direction," a "disc radial direction," and a "disc rotational direction," respectively.

Figure 2:
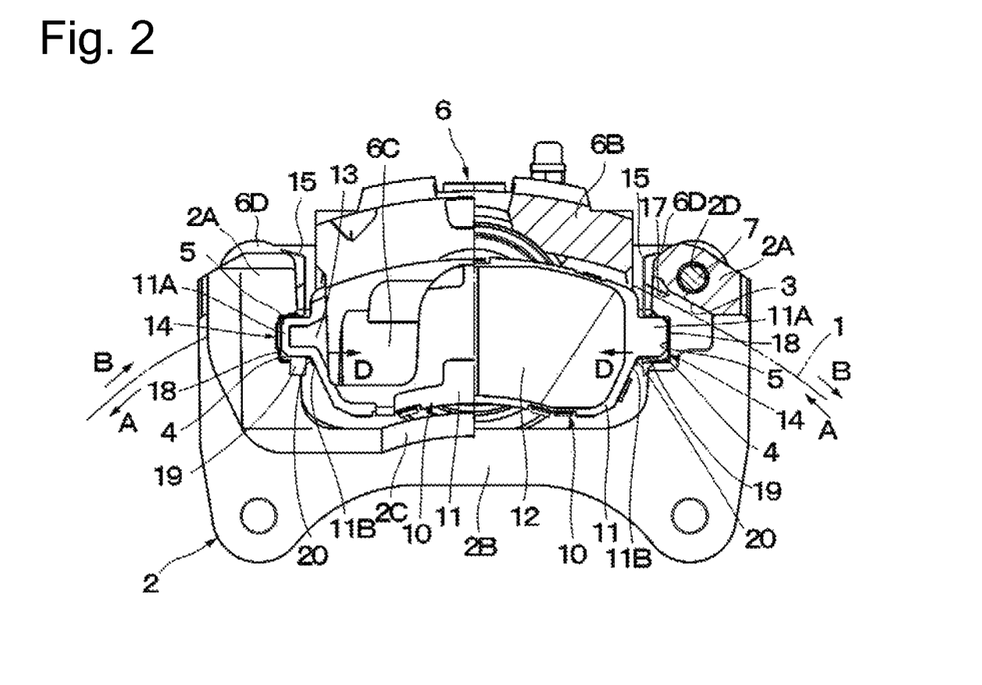
FIG. 2 is a partially cutaway elevation view of the disc brake as viewed from a direction of arrows II-II in FIG. 1.

A mounting member 2 is mounted on a non-rotational portion of the vehicle. As illustrated in FIGS. 1 and 2, the mounting member 2 comprises a pair of right and left arm portions 2A spaced away from each other in the disc rotational direction (circumferential direction) and straddling an outer periphery of the disc 1 in the disc axial direction, a thick-walled support portion 2B integrally coupled to proximal end sides of the arm portions 2A and fixed to the non-rotational portion of the vehicle on an inner side of the disc 1, and other like elements. A reinforcing beam 2C is integrally formed in the mounting member 2 to have an arched shape as illustrated in FIG. 2. The reinforcing beam 2C couples distal end sides of the arm portions 2A together on an outer side of the disc 1. The arm portions 2A of the mounting member 2 are integrally coupled together by the support portion 2B on the inner side of the disc 1 and further integrally coupled together by the reinforcing beam 2C on the outer side of the disc 1.

A disc path portion 3 is formed in each of the arm portions 2A of the mounting member 2 to be located in a middle portion in the axial direction of the disc 1. The disc path portion 3 extends into an arc-like shape along the outer periphery (rotation locus) of the disc 1 as illustrated in FIG. 2. Inner and outer pad guides 4 are formed on respective sides of the disc path portion 3 in the axial direction of the disc 1. The arm portions 2A are provided with pin holes 2D (only one of the pin holes 2D is shown in FIG. 2). Sliding pins 7 described later are slidably inserted in the pin holes 2D.

The pad guide 4 of the arm portion 2A is formed into a recessed groove having a square-cornered U shape-like section as illustrated in FIG. 2 and extends in such a direction that a friction pad 10 described later is displaced in a sliding manner, namely, in the disc axial direction. The pad guide 4 is fitted to an ear portion 11A of the later-described friction pad 10 in a concavo-convex form so as to hold the ear portion 11A from above and beneath (disc radial direction). The pad guide 4 thus guides the friction pad 10 in the disc axial direction through the ear portion 11A. An innermost wall surface of the pad guide 4 formed into the recessed groove is a torque receiving surface 5 that functions as a so-called torque receiving portion. The torque receiving surface 5 is capable of receiving a braking torque generated during brake application, from the friction pad 10 through the ear portion 11A.

The left one between the right and left pad guides 4 illustrated in FIG. 2 (especially the torque receiving surface 5 on a bottom portion side), which is located on an outlet side in the rotational direction of the disc 1 rotating in a direction of an arrow A (hereinafter, referred to as an outward-rotation side), receives the braking torque applied from the disc 1 to the later-described friction pad 10 during brake application through the ear portion 11A of a backing plate 11 and a pad spring 14 described later (guide plate portion 18). The bottom portion side (namely, torque receiving surface 5) of the pad guide 4 which is located on an inlet side in the rotational direction of the disc 1 (hereinafter, referred to as an inward-rotation side) rotating in the direction of the arrow A is located a slight distance away from the ear portion 11A of the friction pad 10 due to a spring force from a contact portion 20 described later.

When the disc 1 rotates in a direction of an arrow B (opposite direction), the bottom portion side (namely, torque receiving surface 5) of the pad guide 4, which is located on the right side on FIG. 2, receives the braking torque applied from the disc 1 to the friction pad 10 (rotary torque acting in the direction of the arrow B) during brake application through the ear portion 11A of the backing plate 11 and the pad spring 14 (guide plate portion 18). At this time, the bottom portion side (namely, torque receiving surface 5) of the pad guide 4, which is located on the inward-rotation side of the disc 1 rotating in the direction of the arrow B, is located a slight distance away from the ear portion 11A of the friction pad 10 due to the spring force from the contact portion 20.

In other words, when the brake is applied on the vehicle traveling forward, the bottom portion side (torque receiving surface 5) of the left one between the right and left pad guides 4 illustrated in FIG. 2, which is located on the outward-rotation side of the disc 1 rotating in the direction of the arrow A, receives the braking torque applied from the disc 1 to the friction pad 10 through the backing plate 11 of the friction pad 10 (the ear portion 11A on the left side on FIG. 2 and the guide plate portion 18 of the pad spring 14). When the brake is applied on the vehicle traveling backward with the disc 1 rotating in the direction of the arrow B, the bottom portion side (torque receiving surface 5) of the pad guide 4 on the right side on FIG. 2 receives the braking torque applied from the disc 1 to the friction pad 10 through the backing plate 11 of the friction pad 10 (the ear portion 11A on the right side on FIG. 2 and the guide plate portion 18 of the pad spring 14).

A caliper 6 is slidably (displaceably) disposed in the mounting member 2. As illustrated in FIG. 1, the caliper 6 comprises an inner leg portion 6A disposed on the inner side that is one side of the disc 1, a bridge portion 6B extending from the inner leg portion 6A to the outer side that is the other side of the disc 1 so as to straddle an outer peripheral side of the disc 1 between the arm portions 2A of the mounting member 2, and an outer leg portion 6C extending inwardly in the radial direction of the disc 1 from the outer side that is an distal end side of the bridge portion 6B, the outer leg portion 6C being configured to function as a claw portion having a two-pronged distal end side. Cylinders, neither shown, are formed in the respective inner leg portions 6A of the caliper 6. A piston is slidably inserted in each of the inner leg portions 6A. The inner leg portions 6A are provided with a pair of mount portions 6D, 6D protruding to the right and left on FIG. 1. The mount portions 6D are provided so that the entire caliper 6 is displaceably supported by the arm portions 2A of the mounting member 2 through the later-described sliding pins 7.

The sliding pins 7 are fastened to the respective mount portions 6D of the caliper 6 with bolts 8 as illustrated in FIG. 1. A distal end side of each of the sliding pins 7 extends toward the pin hole 2D of the arm portion 2A of the mounting member 2. The distal end side of the sliding pin 7 is slidably inserted in the pin hole 2D of the mounting member 2 as exemplified in FIG. 2. Mounted between the arm portion 2A and the sliding pin 7 is a protection boot 9 as illustrated in FIG. 1. The protection boot 9 prevents rainwater or the like from entering between the sliding pin 7 and the pin hole 2D of the arm portion 2A.

Figure 3:
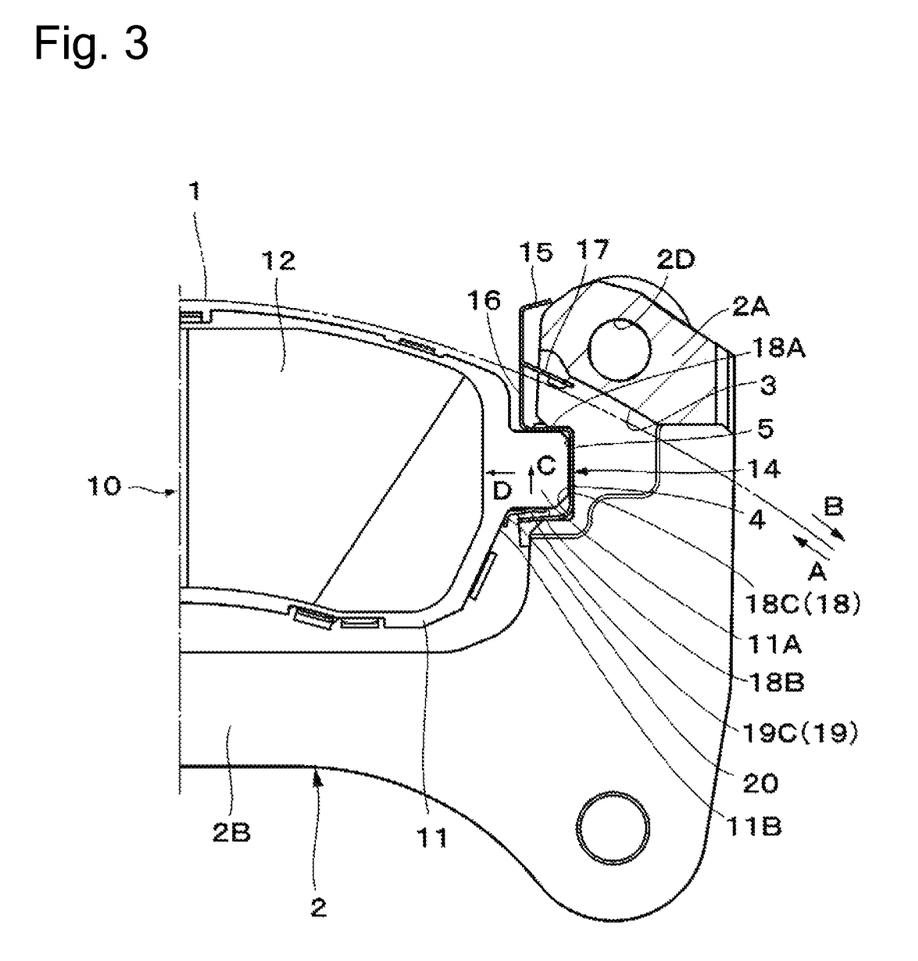
FIG. 3 is an enlarged partial section showing a mounting member, a friction pad, a pad spring and the like with a caliper (cylinder) of FIG. 2 demounted.

The inner and outer friction pads 10 are arranged opposite respective surfaces of the disc 1. As illustrated in FIGS. 2 and 3, each of the friction pads 10 comprises the flat plate-like backing plate 11 extending in a circumferential direction (rotational direction) of the disc 1 into a substantially fan-like shape, and a lining 12 (see FIG. 2) as a friction material that is firmly fixed on a surface side of the backing plate 11 and comes into frictional contact with a surface of the disc 1.

The ear portion 11A is disposed in the backing plate 11 of the friction pad 10. The ear portion 11A functions as a fitting portion protruding from a lateral surface portion located on each side of the backing plate 11 in the disc rotational direction (namely, the circumferential direction of the disc 1) to have a convex shape. The ear portions 11A of the backing plates 11 are inserted in the pad guides 4 of the mounting member 2, which are located on the inward-rotation side and outward-rotation side of the disc 1. The ear portion 11A is allowed to contact the torque receiving surface 5 on the innermost side of the pad guide 4. The ear portion 11A of the friction pad 10 thus forms a torque transmission portion that comes into contact with the torque receiving surface 5 of the mounting member 2 to transmit the braking torque applied from the disc 1 to the friction pad 10 when the vehicle brake is applied. One of the ear portions 11A is arranged on the inlet side in the rotational direction of the disc 1 rotating in the direction of the arrow A when the vehicle travels forward (inward-rotation side), and the other ear portion 11A is arranged on the outlet side in the rotational direction of the disc 1 (outward-rotation side).

The backing plate 11 of the friction pad 10 includes a substantially L-like contacted surface 11B. The contacted surface 11B is located on a proximal end (root) side of the ear portion 11A on each side of the backing plate 11 in the disc rotational direction (namely, the circumferential direction of the disc 1) and close to an inner side of the ear portion 11A in the disc radial direction (lateral surface in the disc rotational direction). In other words, the ear portion 11A is so formed to protrude from each lateral surface of the backing plate 11 in the disc rotational direction (each of the right and left contacted surfaces 11B illustrated in FIG. 2) toward each side of the backing plate 11 in the disc rotational direction. The contact portion 20 of the later-described pad spring 14 is brought into elastic contact with the contacted surface 11B. The inner and outer friction pads 10 are centered at respective middle positions of the pad guides in the disc rotational direction when the brake is not applied.

The ear portion 11A and the contacted surface 11B of the friction pad 10 (backing plate 11) and the like are bilaterally symmetrical and have a similar shape, for example, as illustrated in FIG. 2. This provides component commonality between the friction pads 10 on the inner and outer sides of the disc 1, reduces the number of components of the disc brake, and therefore solves the structural complication of the disc brake. The outer friction pad 10 illustrated in FIG. 2 is provided with a shim plate 13 for noise prevention, which is detachably disposed on a back side of the backing plate 11. The inner friction pad 10 illustrated in FIG. 2 is also provided with a shim plate, not shown, for noise prevention, which is detachably disposed on the back side of the backing plate 11.

Figure 4:
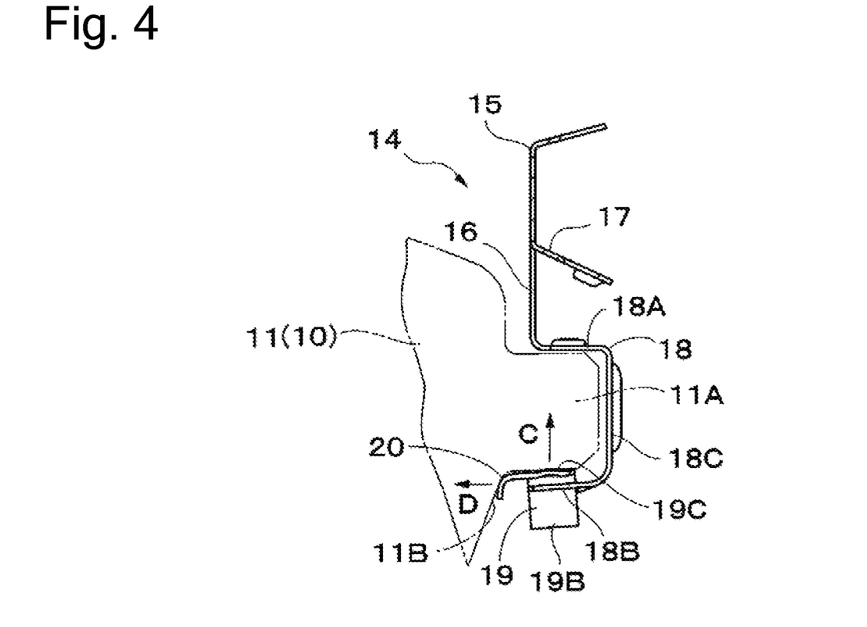
FIG. 4 is an enlarged section taken along the same line as FIG. 2, showing the pad spring on which an ear portion of the friction pad is virtually mounted.
Figure 5:
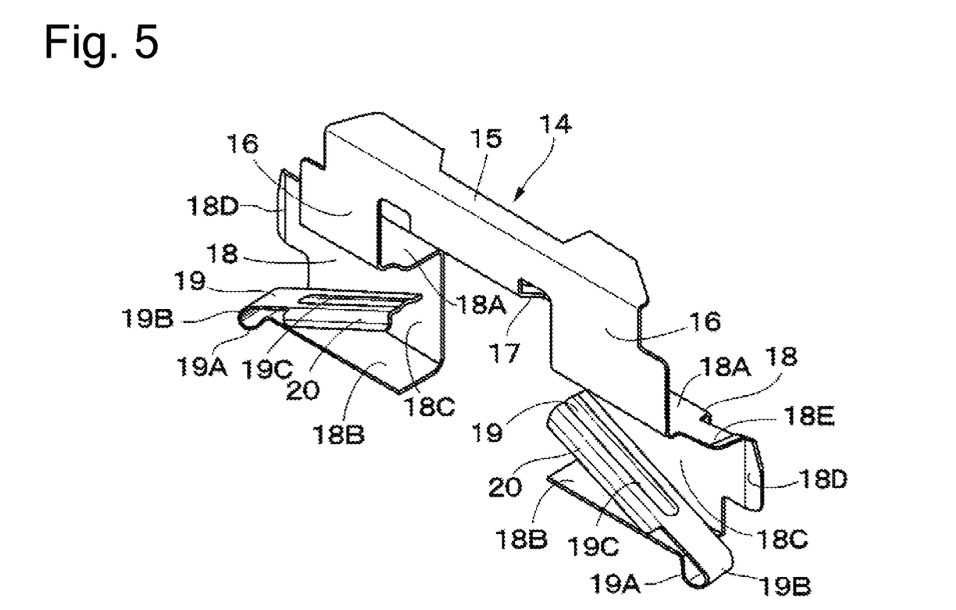
FIG. 5 is a perspective view of the pad spring as viewed from diagonally above.
Figure 6:
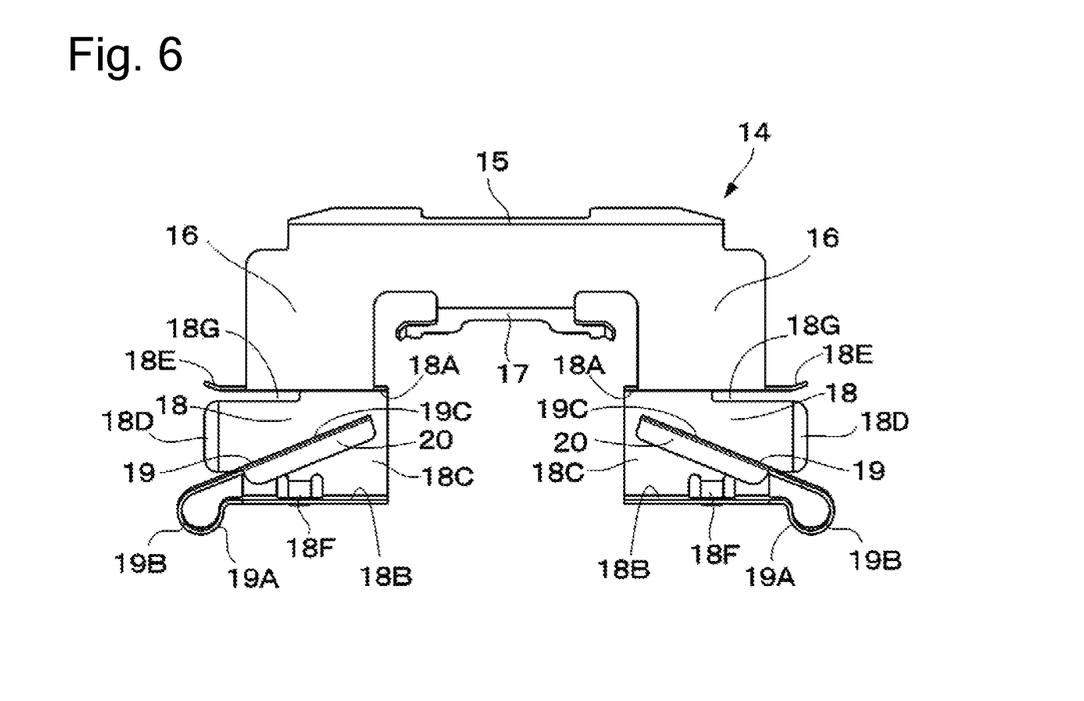
FIG. 6 is an elevation view of the pad spring shown in FIG. 5.

The pair of pad springs 14, 14 is mounted on the arm portions 2A of the mounting member 2. The pad springs 14 elastically support the inner and outer friction pads 10 and facilitate the sliding displacement of the friction pads 10 in the disc axial direction. The pad spring 14 is formed by bending a stainless steel plate or the like with spring properties through a method such as bending (press forming) as illustrated in FIGS. 4 to 6.

The pad spring 14 comprises a coupling plate portion 15 described later, flat plate portions 16, an engaging plate portion 17, the guide plate portions 18, radially biasing portions 19, and the contact portions 20. In the following descriptions about parts of the pad spring 14, the terms "upper side," "upper surface," and "upward" mean a radially outer side of the disc 1, a radially outer surface of the disc 1, and radially outward from the disc 1, respectively, and the terms "lower side," "lower surface," and "downward" mean a radially inner side of the disc 1, a radially inner surface of the disc 1, and radially inward from the disc 1, respectively.

The coupling plate portion 15 of the pas spring 14 axially extends in a position straddling the outer peripheral side of the disc 1 to couple the pair of flat plate portions 16 of the pad spring 14 together and further couple the guide plate portions 18 together, that is, to couple the guide plate portions 18 integrally to each other on the inner and outer sides of the disc 1. The pair of flat plate portions 16, 16 is integrally formed to extend inwardly in the radial direction of the disc 1 on the respective sides of the coupling plate portion 15 in a length direction (disc axial direction). The engaging plate portion 17 is located between the pair of flat plate portions 16 and formed integrally with the coupling plate portion 15. The engaging plate portion 17 is mounted on the mounting member 2 so as to be engaged with the disc path portion 3 of the arm portion 2A from a radially inner side. The pad spring 14 is thus positioned in the disc axial direction relative to the arm portion 2A of the mounting member 2.

The pair of guide plate portions 18, 18 is disposed on respective end sides of the coupling plate portion 15 with the respective flat plate portions 16 intervening therebetween. The guide plate portion 18 is formed by folding the flat plate portion 16 at a lower end side (distal end side) thereof into a substantially square-cornered U-like shape. One of the pair of guide plate portions 18 is fitted inside the inner pad guide 4, and the other guide plate portion 18 is fitted to the outer pad guide 4.

The guide plate portion 18 comprises an upper surface plate 18A as a first plate portion and a lower surface plate 18B as a second plate portion, which are respectively arranged to face upper and lower wall surfaces of the pad guide 4, a guide bottom plate 18C as a bottom plate portion that couples the upper surface plate 18A and the lower surface plate 18B in the radial direction of the disc 1, extends in the disc axial direction into a flat surface-like shape, and comes into contact with the innermost wall surface (namely, torque receiving surface 5) of the pad guide 4, and an axially extending portion 18D that extends from the guide bottom plate 18C outwardly in the disc axial direction and is outwardly inclined on a distal end side at an angle in the circumferential direction of the disc 1.

In other words, each of the pad springs 14 is so configured that the upper surface plate 18A of the guide plate portion 18 extends in the disc axial direction along an outer surface of the ear portion 11A in the disc radial direction, and that the lower surface plate 18B extends in the disc axial direction along an inner surface of the ear portion 11A in the disc radial direction. The guide bottom plate 18C extends in the disc axial direction along an outer surface of the ear portion 11A in the disc rotational direction.

An insertion guide portion 18E is integrally formed in the upper surface plate 18A of the guide plate portion 18. The insertion guide portion 18E protrudes outwardly in the disc axial direction and upwardly inclined at an angle as viewed in FIGS. 5 to 7 (namely, outwardly in the radial direction of the disc 1) at a distal end (protruding end) side. The insertion guide portion 18E is provided to smoothly guide the ear portion 11A of the friction pad 10 to an inner side of the guide plate portion 18 together with the axially extending portion 18D when the ear portion 11A is inserted between the upper surface plate 18A and the lower surface plate 18B of the guide plate portion 18.

Figure 7:
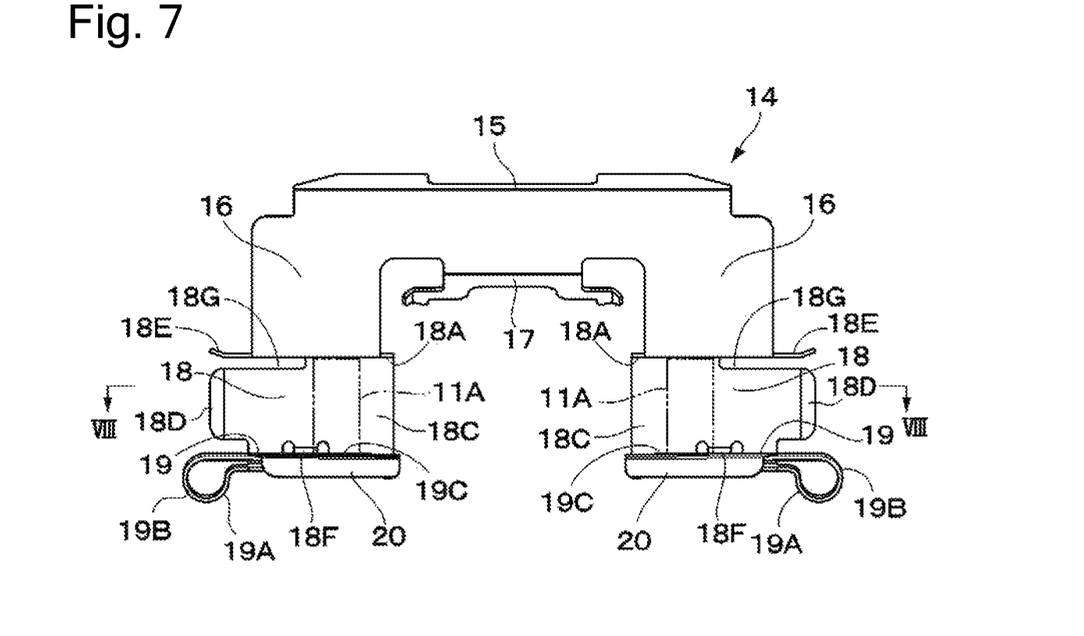
FIG. 7 is an elevation view showing a virtual state in which the pad spring of FIG. 6 is elastically deformed by ear portions of friction pads.

As illustrated in FIGS. 6 and 7, each of the guide plate portions 18 is provided with a locking claw portion 18F. The locking claw portion 18F is located between the lower surface plate 18B and the guide bottom plate 18C further outside than a middle position of the guide bottom plate 18C in the disc axial direction. The locking claw portions 18F are elastically deformed when the guide plate portions 18 of the pad spring 14 are fitted inside the inner and outer pad guides 4. The locking claw portions 18F thus prevent the guide plate portions 18 of the pad spring 14 from falling off the inner and outer pad guides 4. Arranged further outside than an axially middle position of the guide bottom plate 18C, the locking claw portions 18F are arranged away from an area in which the friction pad 10 is arranged in terms of a position in the guide bottom plate 18C in the disc axial direction. This ensures an effect of the falling prevention relative to the pad guides 4.

As illustrated in FIG. 6, a cut-away portion 18G is formed axially outside an area in which the upper surface plate 18A and the axially extending portion 18D of the guide plate portion 18 are connected together. A connect area between the upper surface plate 18A and the axially extending portion 18D can be adjusted in rigidity by varying the length of the cut-away portion 18G. A force acting in the disc radial direction due to vibrations generated in the friction pad 10 is received chiefly by the upper surface plate 18A and the radially biasing portion 19. The cut-away portion 18G reduces the rigidity of the connect area between the upper surface plate 18A and the axially extending portion 18D to facilitate the deformation of the connect area. This generates a flexure in the connect area between the upper surface plate 18A and the axially extending portion 18D and allows more force to be received, which acts in the disc radial direction due to vibrations.

The pair of radially biasing portions 19 configured to bias the ear portions 11A of the friction pad 10 outwardly in the radial direction of the disc 1 (namely, upper side on FIG. 5) extends from the lower surface plate 18B of the guide plate portion 18 in the disc axial direction. The radially biasing portion 19 comprises a first extending portion 19A as a proximal end portion extending from the lower surface plate 18B of the guide plate portion 18 outwardly in the disc axial direction, a curled portion 19B as a folded portion that is formed by folding a distal end side of the first extending portion 19A inwardly in the disc axial direction into a substantially C- or U-like shape, and a second extending portion 19C as a distal end portion extending from the curled portion 19B in a direction approaching the disc 1 and inclined obliquely upward (that is, outwardly in the radial direction of the disc 1), the second extending portion 19 with which the ear portion 11A of the friction pad 10 comes into contact.

When the ear portion 11A of the friction pad 10 is inserted between the upper surface plate 18A and the lower surface plate 18B of the guide plate portion 18, the radially biasing portion 19 undergoes elastic flexural deformation as illustrated in FIGS. 4 and 7 and biases the ear portion 11A of the friction pad 10 in a direction of an arrow C (outwardly in the disc radial direction). The radially biasing portion 19 is elastically deformed so that the second extending portion 19C is held between the ear portion 11A of the friction pad 10 and the lower surface plate 18B. In the foregoing state, the second extending portion 19C of the radially biasing portion 19 elastically biases the ear portion 11A of the friction pad 10 (backing plate 11) outwardly in the radial direction of the disc 1 toward the upper surface plate 18A in the direction of the arrow C, to thereby prevent the friction pad 10 from causing a backlash in the disc radial direction relative to the mounting member 2.

The contact portion 20 of the pad spring 14 extends from the distal end portion (namely, second extending portion 19C) of the radially biasing portion 19 toward a middle of the friction pad 10 (backing plate 11) in the disc rotational direction of the friction pad 10. As illustrated in FIGS. 4 and 5, the contact portion 20 extends from the second extending portion 19C in a disc circumferential direction (rotational direction) to be folded obliquely downward into a V- or L-like shape (namely, a chevron shape). The contact portion 20 of the pad spring 14 comes into surface contact with the contacted surface 11B as a lateral surface of the friction pad 10 (backing plate 11) in the disc rotational direction, to thereby apply to the friction pad 10 (backing plate 11) a biasing force (set load) acting in a direction of an arrow D illustrated in FIGS. 4 and 8.

Each of the pair of pad springs 14 mounted on the arm portions 2A of the mounting member 2 has the guide plate portion 18, the radially biasing portion 19, and the contact portion 20. For example, as illustrated in FIG. 2, the contact portions 20 elastically press the contacted portions 11C of the friction pad 10 (backing plate 11) so as to hold the contacted portions 11C from respective sides in the disc rotational direction (direction of the arrow D in FIG. 3). The friction pad 10 is thus centered at the middle position in the disc rotational direction when the brake is not applied.

Figure 8:
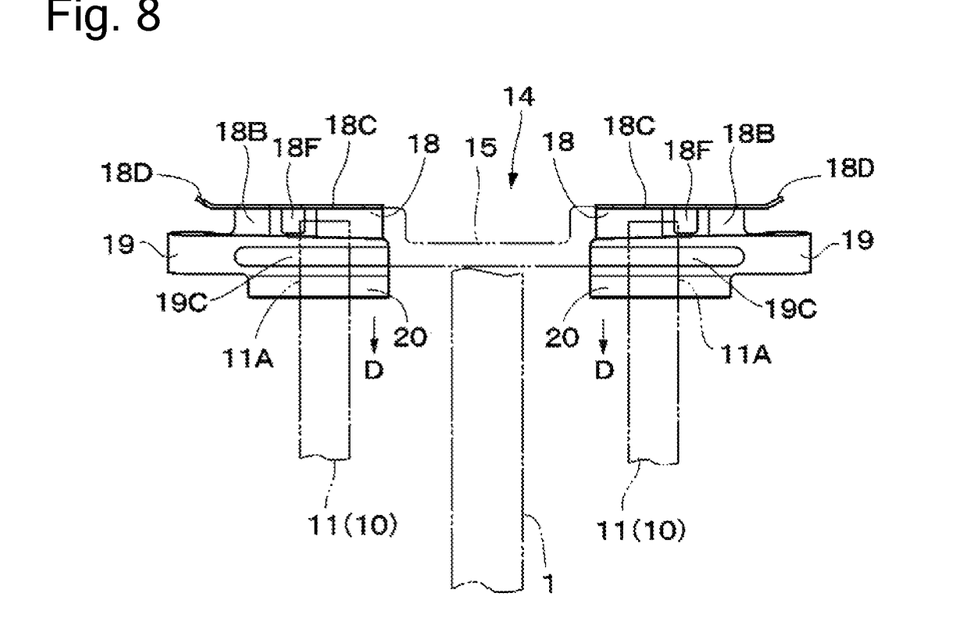
FIG. 8 is an enlarged section showing the pad spring as viewed from a direction of arrows VIII-VIII in FIG. 7.

In other words, the contact portion 20 comes into surface contact with the contacted surface 11B of the backing plate 11 of the friction pad 10, which is a lateral surface in the disc rotational direction, to thereby apply to the friction pad 10 (backing plate 11) the biasing force (set load) acting in the direction of the arrow D illustrated in FIGS. 4 and 8. The contact portion 20 thus functions as a rotational direction biasing member that biases the friction pad 10 in the rotational direction. That is, the contact portion 20 inwardly biases the friction pad 10 in the disc rotational direction (circumferential direction) so as to center the friction pad 10 and prevents the friction pad 10 from causing a backlash in the circumferential direction of the disc 1 attributable to vibrations or the like during vehicle travel.

The length of the contact portion 20 in the disc axial direction is set, for example, to such a length dimension that the contact portion 20 at least continues to contact the contacted surface 11B of the backing plate 11 until the friction pad 10 (lining 12) in a new condition is abraded and needs to be replaced. This allows the contact portion 20 to continue to contact the contacted surface 11B of the backing plate 11 so as to center the friction pad 10 inwardly in the disc rotational direction (circumferential direction) during a time period from when the friction pad 10 is new to when the friction pad 10 needs to be replaced.

As illustrated in FIG. 8, the radially biasing portions 19 of the pad spring 14 are arranged on respective sides (inner and outer sides) of the disc 1 in the axial direction, which is shown by chain double-dashed lines. The radially biasing portion 19 is formed so that the second extending portion 19C extends at an angle to a flat surface of the guide bottom plate 18C in the disc axial direction, for example, so that the curled portion 19B is twistingly folded at a slight angle, in an initial state where brake application is released (state illustrated in FIG. 8). That is, the second extending portion 19C is beforehand inclined at an angle to the guide bottom plate 18C (direction of the arrow D in FIG. 8) in a planar view so that a clearance between the guide bottom plate 18C and the second extending portion 19C in the disc rotational direction is larger in the inner side in the disc axial direction than in the outer side in the disc axial direction. The contact portion 20 is also beforehand inclined at an angle to the guide bottom plate 18C as well as the second extending portion 19C.

Figure 9:
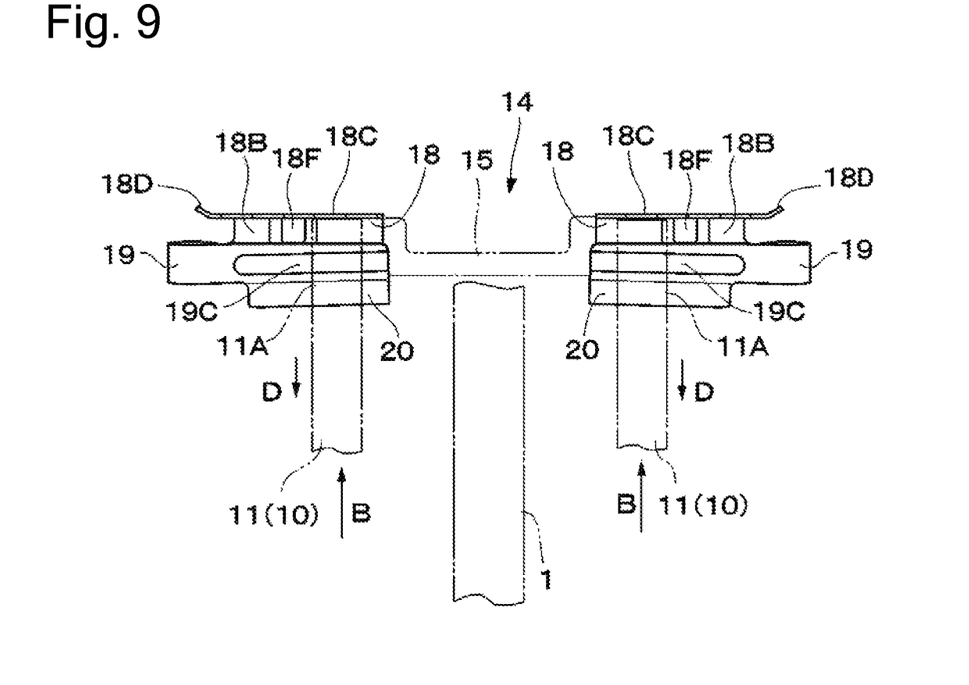
FIG. 9 is an enlarged section taken along the same line as FIG. 8, showing the pad spring that is elastically deformed by a braking torque.

Meanwhile, FIG. 9 shows a state in which a braking force is applied to the disc 1 rotating, for example, in the direction of the arrow B through the pair of friction pads 10. The ear portion 11A of the friction pad 10 (backing plate 11) is moved in the direction of the arrow B to a position where the ear portion 11A contacts the guide bottom plate 18C of the pad spring 14 (guide plate portion 18) due to a braking torque applied from the disc 1 to the friction pad 10 during brake application. At this time, the braking torque is received on the bottom portion side (namely, torque receiving surface 5 illustrated in FIG. 3) of the pad guide 4, which is located on the outward-rotation side of the disc 1 rotating in the direction of the arrow B.

The second extending portion 19C of the radially biasing portion 19 and the contact portion 20 therefore undergo elastic flexural deformation in the disc rotational direction by the braking torque acting in the direction of the arrow B as illustrated in FIG. 9. In the foregoing state, the second extending portion 19C is elastically deformed to extend in the disc axial direction substantially parallel to the guide bottom plate 18C. The contact portion 20 is also arranged to extend in the disc axial direction substantially parallel to the guide bottom plate 18C as well as the second extending portion 19C. At this point, the curled portion 19B of the radially biasing portion 19 is elastically deformed in a twisting manner and generates an elastic reaction force (biasing force acting in the direction of the arrow D) against the second extending portion 19C and the contact portion 20.

FIGS. 8 and 9 describe the invention, taking as an example a case in which the braking force is applied to the disc 1 rotating in the direction of the arrow B through the pair of friction pads 10. FIGS. 8 and 9 are intended to facilitate the description of the above-mentioned case in relation to the ear portion 11A of the friction pad 10 and the pad spring 14 illustrated in FIGS. 3 and 4. For example, when the braking force is applied to the disc 1 rotating in the direction of the arrow A in FIGS. 1 and 2 through the pair of friction pads 10, the second extending portion 19C and the contact portion 20 of the pad spring 14 are elastically deformed to be substantially parallel with the guide bottom plate 18C as in the foregoing case, which makes it possible to generate an elastic return force acting on the pair of friction pads 10 (biasing force acting in the direction of the arrow D).

The contact portion 20 is formed as a folded portion which protrudes inwardly in a circumferential direction of the disc 1 (namely, toward the middle of the friction pad 10), for example, from a substantially entire length of the second extending portion 19C of the radially biasing portion 19 in a length direction and is inclined obliquely downward. The contact portion 20 integrally formed in the second extending portion 19C of the radially biasing portion 19 therefore also functions to smoothly guide the ear portion 11A of the friction pad 10 to the inner side of the guide plate portion 18 together with the radially biasing portion 18D and the insertion guide portion 18E when the ear portion 11A is inserted between the upper surface plate 18A of the guide plate portion 18 and the second extending portion 19C of the radially biasing portion 19.

As illustrated in FIGS. 4 to 6, the pad spring 14 is formed by bending (press forming) a stainless steel plate or the like with spring properties. For example, the proximal end portion (first extending portion 19A), the folded portion (curled portion 19B), and the distal end portion (second extending portion 19C) of the radially biasing portion 19 and the contact portion 20 of the pad spring 14 are bent as illustrated in FIGS. 5 and 6 by a method such as bending through forming process or the like. When the radially biasing portion 19 is in a free length state (state in which the radially biasing portion 19 is not applied with an external force), there is a gap between the lower surface plate 18B of the guide plate portion 18 and the contact portion 20, which enables the bending through forming process for forming the radially biasing portion 19 and the contact portion 20 to be favorably performed.

The disc brake according to the present embodiment is thus configured. Operation of the disc brake is discussed below.

When the vehicle brake is applied, the inner leg portion 6A (cylinder) of the caliper 6 is supplied with hydraulic brake pressure to displace the piston toward the disc 1 in the sliding manner. The inner friction pad 10 is thus pressed against one side face of the disc 1. At this point, the caliper 6 receives a pressing reaction force from the disc 1, so that the entire caliper 6 is displaced in the sliding manner to the inner side relative to the arm portion 2A of the mounting member 2, and the outer leg portion 6C presses the outer friction pad 10 against the other side face of the disc 1.

Consequently, the inner and outer friction pads 10 firmly hold the disc 1 therebetween from both axial sides, which rotates in the direction of the arrow A in FIGS. 1 and 2 (when the vehicle travels forward), to thereby apply the braking force to the disc 1. When the brake application is released, the supply of the hydraulic pressure to the piston is discontinued, and the inner and outer friction pads 10 move away from the disc 1 and return into a non-braking state.

For example, when the brake application is released (when the brake is not applied), the ear portion 11A of the friction pad 10 is elastically biased in the disc radial and rotational directions by the pair of pad springs 14 disposed in the arm portions 2A of the mounting member 2 (namely, the inward-rotation side and outward-rotation side of the disc 1). The pair of pad springs 14 then prevents the friction pad 10 from causing a backlash in the radial and circumferential directions of the disc 1 attributable to the vibrations or the like during vehicle travel.

The contact portion 20 disposed in each of the pad springs 14 restrains the backlash of the friction pad 10 in the circumferential direction of the disc 1, which is caused by the vibrations or the like during vehicle travel. The contact portion 20 comes into surface contact with the contacted surface 11B of the backing plate 11 of the friction pad 10, which is the lateral surface in the disc rotational direction. This makes it possible to bias the friction pad 10 inwardly in the disc rotational direction (circumferential direction) so as to center the friction pad 10 and prevent the friction pad 10 from causing a backlash in the circumferential direction of the disc 1 attributable to the vibrations or the like during vehicle travel.

When the vehicle brake is applied, the inner and outer friction pads 10 (ear portions 11A) centered by the pad springs 14 (contact portions 20) on the disc inward-rotation side and outward-rotation side are displaced to respective positions where the friction pads 10 contact the torque receiving surfaces 5 of the pad guides 4 due to the braking torque applied from the disc 1 (rotary torque acting in the direction of the arrow A or B). However, a pad displacement amount (displacement amount in the disc rotational direction) at this point is relatively small due to the centering function, and the pad displacement amount is kept small no matter whether the vehicle travels forward or backward. This provides an advantageous effect, for example, against a clonking noise.

The contact portion 20 which functions against the clonking noise comes into surface contact with the contacted surface 11B that is the lateral surface in the disc rotational direction on the proximal end (root) side of the ear portion 11A of the friction pad 10. The contact portion 20 therefore easily avoids interference, for example, with a sensor, not shown, which detects pad abrasion. This enhances layout performance and improves workability in pad assembly.

The ear portions 11A integrally formed in the backing plates 11 of the friction pads 10 are slidably inserted in the pad guides 4, 4 located on the inward-rotation and outward-rotation sides of the disc 1 with the guide plate portions 18 of the pad spring 14 intervening therebetween. The ear portions 11A are biased by the radially biasing portions 19 outwardly in the radial direction of the disc 1. The ear portions 11A of the friction pads 10 therefore can be elastically pressed toward the upper surface plates 18A (outer surfaces in the radial direction of the disc 1) of the guide plate portions 18.

The radially biasing portion 19 of the pad spring 14 thus restrains the backlash of the friction pad 10 in the radial direction of the disc 1 attributable to the vibrations or the like during travel. The ear portions 11A of the friction pads 10 is therefore kept in sliding contact with the upper surface plate 18A sides of the guide plate portions 18, and furthermore, the inner and outer friction pads 10 are smoothly guided in the disc axial direction along the guide plate portions 18 when the brake is applied.

According to the present embodiment, as described above, the contact portion 20 extends from the second extending portion 19C of the radially biasing portion 19 of the pad spring 14 toward the middle of the friction pad 10 in the disc rotational direction of the friction pad 10. That is, the radially biasing portion 19 of the pad spring 14 comprises the first extending portion 19A extending from the lower surface plate 18B of the guide plate portion 18 outwardly in the disc axial direction, the curled portion 19B folded on the distal end side of the first extending portion 19A, and the second extending portion 19C extending from the curled portion 19B in the direction approaching the disc 1, the second extending portion 19 with which the ear portion 11A of the friction pad 10 comes into contact. The contact portion 20 is formed as a chevron-shaped folded portion protruding from the second extending portion 19C of the radially biasing portion 19 inwardly in the circumferential direction of the disc 1 (namely, toward the middle of the friction pad 10) and inclined obliquely downward.

The contact portion 20 thus formed comes into surface contact with the contacted surface 11B as the lateral surface of the friction pad 10 (backing plate 11) in the disc rotational direction and is capable of applying to the friction pad 10 (backing plate 11) the biasing force (set load) acting in the direction of the arrow D shown in FIGS. 4 and 8. The contact portion 20 functions as a rotational direction biasing member that biases the friction pad 10 in the rotational direction. The contact portion 20 is capable of biasing the friction pad 10 inwardly in the disc rotational direction (circumferential direction) so as to center the friction pad 10 and preventing the friction pad 10 from causing a backlash in the circumferential direction of the disc 1 attributable to the vibrations or the like during vehicle travel.

As illustrated in FIG. 8, the radially biasing portion 19 of the pad spring 14 is so formed that the second extending portion 19C extends at an angle to the flat surface of the guide bottom plate 18C in the disc axial direction, and for example, that the curled portion 19B is twistingly folded at a slight angle. As illustrated in FIG. 9, for example, when the braking force is applied to the disc 1 rotating in the direction of the arrow B through the pair of friction pads 10, the second extending portions 19C of the radially biasing portions 19 and the contact portions 20 undergo the elastic flexural deformation in the disc rotational direction due to the braking torque acting, for example, in the direction of the arrow B. In this state, the second extending portion 19C is elastically deformed to extend in the disc axial direction substantially parallel to the guide bottom plate 18C, and the contact portion 20 is also arranged to extend in the disc axial direction substantially parallel to the guide bottom plate 18C as well as the second extending portion 19C.

The curled portion 19B of the radially biasing portion 19 is elastically deformed in the twisting manner and capable of generating an elastic reaction force against the second extending portion 19C and the contact portion 20. It is then possible to maintain a substantially constant sliding resistance at which the ear portions 11A are displaced in a sliding manner relative to the pad springs 14 (the radially biasing portions 19 and the contact portions 20) even if the pads are abraded. This improves the reliability and life of the pad springs 14 (stability of the pad springs 14).

In other words, when the friction pads 10 are new, the biasing force (set load) applied by the contact portions 20 in the direction of the arrow D shown in FIG. 8 can be set to a large value according to pad mass. When the mass of the friction pads 10 is reduced by degrees along with pad abrasion, the inner and outer friction pads 10 approach the respective surfaces of the disc 1, which gradually reduces the biasing force (set load) that is applied by the contact portions 20 in the direction of the arrow D shown in FIG. 8 and makes it possible to maintain the substantially constant sliding resistance between the pad springs 14 and the friction pads 10. This improves the stability, reliability and life of the pad springs 14.

The contact portion 20 of the pad spring 14 comes into surface contact with the contacted surface 11B that is the lateral surface of the friction pad 10 in the disc rotational direction on the proximal end (root) side of the ear portion 11A. It is then possible, for example, to stabilize an attitude of the pad spring 14 when the friction pad 10 is assembled inside the pad guide 4 of the mounting member 2 through the pad spring 14. This improves mounting workability and prevents defective mounting or the like which is attributed to the contact portion 20.

According to the present embodiment, the contact portion 20 disposed in the distal end portion (second extending portion 19C) of the radially biasing portion 19 is capable of biasing the friction pad 10 toward the middle in the rotational direction. The contact portion 20 formed in the distal end portion of the radially biasing portion 19 of the pad spring 14 therefore can be used as the rotational direction biasing portion. This reduces a material cost for the pad spring 14 and improves productivity, as compared to conventional art in which a radially biasing portion and a rotation direction biasing portion are separately disposed.

The embodiment is described, taking as an example the case in which the pair of pad springs 14 mounted on the arm portions 2A (disc inward-rotation and outward-rotation sides) of the mounting member 2 comprises the guide plate portions 18, the radially biasing portions 19, and the contact portions 20. The invention, however, is not limited to what is described in the foregoing embodiment. For example, the pad spring located on the disc outward-rotation side or disc inward-rotation side during the forward travel of the vehicle does not necessarily have to be provided with a contact portion which contacts the lateral surface of the friction pad in the disc rotational direction. For example, the pad spring located on either the disc outward-rotation side or the disc inward-rotation side may be configured in a similar manner to existing pad springs.

The embodiment is described, taking as an example the case in which the torque receiving surface 5 functioning as the torque receiving portion is formed of the innermost wall surface of the pad guide 4 comprising the square-cornered U-shaped recessed groove. The invention, however, is not limited to what is described in the foregoing embodiment. The invention is applicable, for example, to a disc brake of a type in which a torque receiving surface as a torque receiver is disposed away from a pad guide (in a position different from that of the pad guide).

Considerable disc brakes based on the above-discussed embodiment include, for example, those according to the following modes.

A disc brake according to a first mode comprises a mounting member including a pair of arm portions spaced away from each other in a rotational direction of a disc and straddling an outer peripheral side of the disc, the arm portions being provided with respective pad guides; a caliper disposed in each of the arm portions of the mounting member to be movable in a disc axial direction; a pair of friction pads including ear portions inserted in the respective pad guides of the mounting member, the pair of friction pads being pressed by the caliper against respective surfaces of the disc; and a pair of pad springs mounted on the respective arm portions of the mounting member and configured to elastically support the pair of friction pads between the arm portions. At least one of the pair of pad springs includes a guide plate portion comprising, for the purpose of guiding the ear portion in the disc axial direction, a first plate portion extending in the disc axial direction along an outer surface of the ear portion of the friction pad in a disc radial direction, a second plate portion extending in the disc axial direction along an inner surface of the ear portion in the disc radial direction, and a bottom plate portion extending in the disc axial direction along an outer surface of the ear portion in the disc rotational direction; a radially biasing portion comprising a proximal end portion including a proximal end side extending from the second plate portion of the guide plate portion outwardly in the disc axial direction, a folded portion formed by being folded from the proximal end portion inwardly in the disc axial direction into a shape of a letter U, and a distal end portion extending from the folded portion in the disc axial direction between the second plate portion and the ear portion of the friction pad, the radially biasing portion being configured to elastically bias the friction pad through the distal end portion outwardly in the disc radial direction; and a contact portion extending from the distal end portion of the radially biasing portion toward a middle of the friction pad in the disc rotational direction of the friction pad and configured to contact a lateral surface of the friction pad in the disc rotational direction.

In a second mode according to the first mode, the contact portion comes into elastic contact with a lateral surface of the friction pad in the disc rotational direction, which is located on a proximal end side of the ear portion. The contact portion integrally formed on a distal end side of the radially biasing portion of the pad spring comes into elastic contact with the lateral surface of the friction pad in the disc rotational direction, which is located on the proximal end side of the ear portion. The contact portion is then capable of biasing the friction pad toward a middle in the rotational direction. The contact portion formed in the distal end portion of the radially biasing portion of the pad spring can be therefore used as a rotational direction biasing portion. This reduces the material cost for the pad springs and improves productivity.

In a third mode according to the first or second mode, each of the pair of pad springs includes the guide plate portion, the radially biasing portion, and the contact portion. The friction pad is elastically pressed so as to be held by the contact portions from both sides of the friction pad in the disc rotational direction. The contact portions of the pad springs are thus capable of biasing the friction pad inwardly in the disc rotational direction (circumferential direction) so as to center the friction pad. This prevents the friction pad from causing a backlash in the circumferential direction of the disc attributable to the vibrations or the like during vehicle travel.

In a fourth mode according to any one of the first to third modes, each of the pair of pad springs includes a locking claw portion located further outside than an axially middle position of the bottom plate portion, the locking claw portions being configured to lock the pad springs to the mounting member. In a fifth mode according to any one of the first to fourth modes, each of the pair of pad springs includes a cut-away portion axially outside an area in which the first plate portion and the bottom plate portion are connected together.

The invention is not limited to the above-discussed embodiments and may be modified in various ways. For example, the embodiments are intended to describe the invention in detail for easy understanding and do not necessarily have to include all the configurations mentioned above. The configuration of each embodiment may be partially replaced with another configuration or incorporated with another configuration. It is also possible to incorporate, omit or replace a part of the configuration of one of the embodiments into, from or with the configuration of another one of the embodiments.

The present application claims priority under Japanese Patent Application No. 2017-135561 filed on Jul. 11, 2017. The entire disclosure of Japanese Patent Application No. 2017-135561 filed on Jul. 11, 2017 including the description, claims, drawings and abstract, is incorporated herein by reference in its entirety.

REFERENCE SIGN LIST

1: disc
2: mounting member
2A: arm portion
3: disc path portion
4: pad guide
5: torque receiving surface
6: caliper
7: sliding pin
10: friction pad
11: backing plate
11A: ear portion
11B: contacted portion (lateral surface in the disc rotational direction)
12: lining
14: pad spring
15: coupling plate portion 18: guide plate portion
18A: upper surface plate (first plate portion)
18B: lower surface plate (second plate portion)
18C: guide bottom plate (bottom plate portion)
18F: locking claw portion
18G: cut-away portion
19: radially biasing portion
19A: first extending portion (proximal end portion)
19B: curled portion (folded portion)
19C: second extending portion (distal end portion)
20: contact portion

The invention claimed is:

1. A disc brake comprising:
a mounting member including a pair of arm portions spaced away from each other in a rotational direction of a disc and straddling an outer peripheral side of the disc, the arm portions being provided with respective pad guides;
a caliper disposed in each of the arm portions of the mounting member to be movable in a disc axial direction;
a pair of friction pads including ear portions inserted in the respective pad guides of the mounting member, the pair of friction pads being pressed by the caliper against respective surfaces of the disc; and
a pair of pad springs mounted on the respective arm portions of the mounting member and configured to elastically support the pair of friction pads between the arm portions,
at least one of the pair of pad springs including a guide plate portion for guiding the ear portion of the friction pad in the disc axial direction,
the guide plate portion including a first plate portion extending in the disc axial direction along an outer surface of the ear portion in a disc radial direction, a second plate portion extending in the disc axial direction along an inner surface of the ear portion in the disc radial direction, and a bottom plate portion extending in the disc axial direction along an outer surface of the ear portion in the disc rotational direction,
the at least one of the pad springs further including:
a radially biasing portion comprising a proximal end portion including a proximal end side extending from the second plate portion of the guide plate portion outwardly in the disc axial direction, a folded portion formed by being folded from the proximal end portion inwardly in the disc axial direction into a shape of a letter U, and a distal end portion extending from the folded portion in the disc axial direction between the second plate portion and the ear portion of the friction pad, the radially biasing portion being configured to elastically bias the friction pad through the distal end portion outwardly in the disc radial direction; and
a contact portion extending from the distal end portion of the radially biasing portion toward a middle of the friction pad in the disc rotational direction of the friction pad, and
wherein the contact portion is in contact with a lateral surface of the friction pad to inwardly bias the friction pad in the disc rotational direction with the friction pad being attached to the pad spring in a fully assembled operational state.

2. The disc brake according to claim 1, wherein the contact portion comes into elastic contact with the lateral surface of the friction pad in the disc rotational direction, which is located on the proximal end side of the ear portion.

3. The disc brake according to claim 2,
wherein each of the pair of pad springs includes the guide plate portion, the radially biasing portion, and the contact portion, and
wherein the friction pad is elastically pressed by the contact portions so as to be held by the contact portions from both sides of the friction pad in the disc rotational direction.

4. The disc brake according to claim 2, wherein each of the pair of pad springs includes a locking claw portion located further outside than an axially middle position of the bottom plate portion and configured to lock the pad springs to the mounting member.

5. The disc brake according to claim 2, wherein each of the pair of pad springs includes a cut-away portion axially outside an area in which the first plate portion and the bottom plate portion are connected together.

6. The disc brake according to claim 1,
wherein each of the pair of pad springs includes the guide plate portion, the radially biasing portion, and the contact portion, and
wherein the friction pad is elastically pressed by the contact portions so as to be held by the contact portions from both sides of the friction pad in the disc rotational direction.

7. The disc brake according to claim 6, wherein each of the pair of pad springs includes a locking claw portion located further outside than an axially middle position of the bottom plate portion and configured to lock the pad springs to the mounting member.

8. The disc brake according to claim 6, wherein each of the pair of pad springs includes a cut-away portion axially outside an area in which the first plate portion and the bottom plate portion are connected together.

9. The disc brake according to claim 1, wherein each of the pair of pad springs includes a locking claw portion located further outside than an axially middle position of the bottom plate portion and configured to lock the pad springs to the mounting member.

10. The disc brake according to claim 9, wherein each of the pair of pad springs includes a cut-away portion axially outside an area in which the first plate portion and the bottom plate portion are connected together.

11. The disc brake according to claim 1, wherein each of the pair of pad springs includes a cut-away portion axially outside an area in which the first plate portion and the bottom plate portion are connected together.

* * * * *